Oct. 11, 1960 B. GRAHAM 2,955,953
PROCESS OF ADHERING AN ORGANIC COATING TO A POLYMERIC SUBSTRATE
Filed June 5, 1956
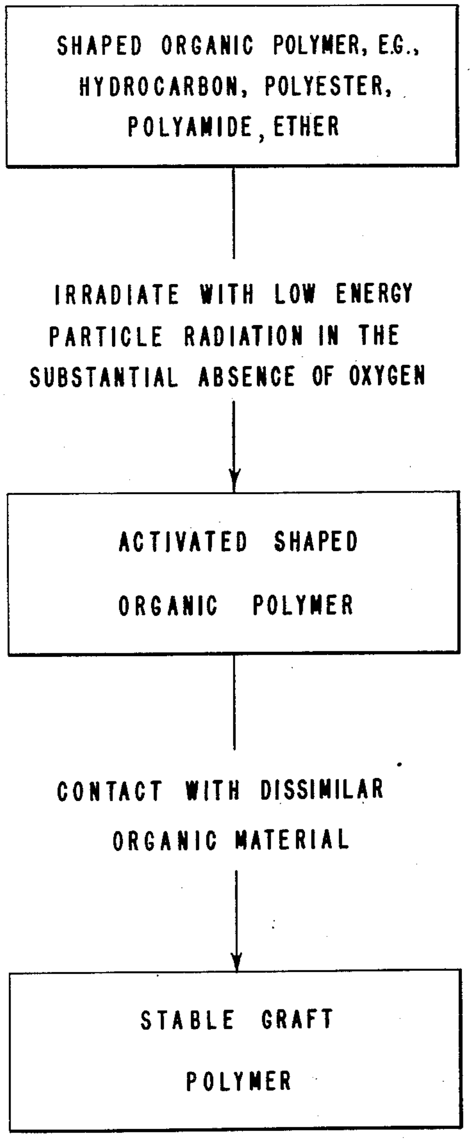
INVENTOR
BOYNTON GRAHAM
BY James H. Ryan
ATTORNEY United States Patent Office
2,955,953
Patented Oct. 11, 1960

2,955,953

PROCESS OF ADHERING AN ORGANIC COATING TO A POLYMERIC SUBSTRATE

Boynton Graham, Wilmington, Del., assignor to E. I. du Pont de Nemours and Company, Wilmington, Del., a corporation of Delaware Filed June 5, 1956, Ser. No. 589,373
9 Claims. (Cl. 117—47)

This invention is concerned with a new method of affixing a coating of organic material to an organic polymer substrate.

It has been observed that coatings of organic materials can be affixed to organic polymer substrates which have been subjected to the action of high energy ionizing radiation. However, the exposure of synthetic polymers to high energy radiation involves many side effects, including crosslinking and degradation, which alter the physical properties of the irradiated polymer.

It is an object of this invention to provide a process which utilizes relatively low energy radiation to cause organic coatings to be affixed to organic polymer substrates without affecting the bulk physical properties of the substrate. Other objects of the invention will become apparent from the specification and claims.

There has now been discovered a process for affixing to an organic polymer substrate a coating of a dissimilar organic material by subjecting the substrate in the substantial absence of oxygen to charged particle ionizing radiation having an energy of from 15 to 50,000 electron volts for a minimum exposure of 0.01 watt-seconds per square centimeter and thereafter, while the effect of irradiation is still active, coating the organic polymer substrate with a thin coating of the dissimilar organic material so that the coating is bonded to the substrate. This invention is shown broadly in the appended drawing, a self-explantory flowsheet of the process.

This new process can be used with all types of ionizing charged particle radiation which have energies in the above voltage range when they impinge on the substrate. It is particularly advantageous to subject a substrate to radiation in the form of electrons, which therefore represents the preferred species of the invention.

The temperature at which the irradiation step is carried out may be varied from extremely low temperatures up to the decomposition temperature of the organic coating or substrate. The desired changes in the polymer substrate increase in stability as the temperature is lowered below room temperature and, for this reason, irradiation temperatures in the range of —70° to 0° C. are preferred. However, there is little advantage in employing extremes of temperature when the effect of the irradiation is adequate for the coating conditions employed, and for reasons of convenience and economy, room temperature is then preferred.

In employing this invention, the organic polymer substrate is first subjected to ionizing radiation having an energy of from 0.000015 to 0.05 mev. and then subsequently, while the effect of irradiation is still active, contacted with the dissimilar organic material which thereby becomes permanently attached to the substrate. The time which may elapse between the irradiation step and the contacting step will vary with the radiation exposure, temperature and atmosphere of storage, and the chemical nature of the irradiated polymer. A storage time of not over five minutes between steps is usually preferred and a time of less than one second between steps is frequently desirable. It has been observed, however, that the effects of the irradiation can be sustained for longer periods of time, i.e., weeks and even months, particularly if the irradiated shaped polymer is kept in an inert atmosphere such as under nitrogen, argon, helium or the like and/or is stored at low temperature such as at —80° C. In general, the lower the temperature at which the irradiated shaped polmer is stored, the longer the time the surface remains active toward adhering a coating of a dissimilar organic compound. It is thus possible to irradiate the shaped polyer at a site of available radiation and then by maintaining suitable storage conditions as above to ship the irradiated polymer to another site for carrying out the contacting step.

The temperature at which the contacting step of this invention is carried out may be varied within wide limits. Thus, the irradiated organic polymer may be contacted with the dissimilar organic compound at temperatures ranging from —70° to 300° C., depending on the thermal properties of the polymer and the coating material. A substantial portion of the affixing reaction occurs within the first 3–5 seconds of contact. The total duration of contact may be extensively prolonged if convenient, but excess of the dissimilar organic compound may be safely removed after 24 hours since no significant amount of material becomes affixed after this time.

In carrying out the process of this invention it is essential that the irradiation-induced activity which leads to the bonding of the chemically dissimilar coating material to the polymeric substrate should not be unduly inhibited in forming nor substantially dissipated in side reactions other than bonding of the coating. This may be accomplished by carrying out the process in the substantial absence of oxygen since oxygen tends to react with the radiation-induced active centers in the substrate or coating to form oxo linkages. Absolute freedom from oxygen is not essential, however. Some oxygen is tolerated, particularly when the volume of the polymeric substrate and coating is large in comparison with the enclosure in which the irradiation is effected or when the exposure to oxygen is very brief, but the amount of oxygen should not be sufficient to react with all the radiation-induced active centers formed. Operating in a vacuum, or at least under reduced pressure, is frequently desirable since this not only serves to reduce the concentration of oxygen but lowers the number of collisions of the radiation particles with other gases that might be present, and thereby increases the efficiency of the irradiation.

Under some circumstances, the efficiency of irradiation is increased when the surface being irradiated is electrically grounded. This is accomplished by selecting a polymer substrate which is at least somewhat electrically conductive and grounding the substrate.

By organic polymer substrate we mean any natural or synthetic normally solid organic polymeric material, particularly those with molecular weights in excess of 500. The polymer may be oriented or unoriented. Thus, there may be employed hydrocarbon polymers, such as polyethylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoroethylene, polyvinyl fluoride, chlorinated and chlorosulfonated polyethylene and the like; ester-containing polymers, such as polyvinyl acetate, polymethyl methacrylate, polyethylene terephthalate and the like; hydroxyl-containing polymers, such as polyvinyl alcohol, cellulose, regenerated cellulose and the like; ether-containing polymers, such as polyethylene oxide, polymeric formaldehyde, solid polytetrahydrofuran, dioxolane polymers and the like; condensation polymers, such as nylons, polyimides, phenol-formaldehyde polymers, urea-formaldehyde polymers, triazine-formaldehyde polymers and the like, polypeptides, silicones, olefin polysulfones as well as natural polymers such as wool, cotton, silk and the like.

The chemical nature of the organic material used to form coatings in accordance with this invention is limited only by the requirement that it be chemically distinguishable from the substrate. Thus, the invention comprises adhering a layer of organic material which is chemicaly dissimilar to the polymeric substrate. The organic coating material may be in the form of a gas or vapor which is brought in contact with the irradiated substrate. Liquids may be applied to the substrate by any of the usual methods of coating, such as by dipping, spraying, brushing, printing and the like. Solids may be applied to the substrate by sublimation or by coating from melt. The organic compound which comprises the coating may be a hydrocarbon, halogenated hydrocarbon, alcohol, amine, aldehyde, ketone, ether, acid, ester, amide, phenol, sulfonic acid, nitro compound, fat, protein, synthetic polymer and other organic compounds which contain at least one C—X bond, where X is hydrogen or halogen. It is preferable that the organic compound be a material which is normally incompatible with the substrate and has no solvent action thereon.

Among the non-polymeric organic compounds a preferred group of coating materials which are highly reactive in the process of this invention are the chain transfer agents, e.g., compounds containing active hydrogen or halogen such as chloroform, carbon tetrachloride, triphenylmethane, thiols, secondary alcohols, maleic anhydride and the like.

Another preferred group of non-polymeric organic coating compounds are those which are normally non-polymerizable, since with them the amount of coating affixed by the process of this invention is most readily controlled.

Another preferred group of organic compounds are the polymers and particularly the polymeric ethers because they readily give high degrees of modification.

The low energy ionizing charged particle radiation employed in the present invention may be in such forms as alpha particles or electrons and is limited only by the energy it possesses at the time it reaches the substrate to which the coating is to be affixed. The low-energy charged particle radiation may be generated by known methods that do not form a part of this invention. Thus, particles of suitable energy may be obtained by means of appropriate voltage gradients, using such devices as a cathode ray tube, a resonant cavity accelerator, a Van de Graaff generator or the like. The accelerated particles may be utilized in a vacuum by introducing the substrate into the vacuum chamber of the accelerator. Alternatively, the accelerated electrons or alpha-particles may be let out in known manner through a window and utilized in air or a gas, with due precautions being taken that the particles have the desired energy when they impinge on the substrate. A preferred radiation in the process of this invention is that obtained from low energy electrons which are readily generated by means of a suitable voltage gradient, such as that supplied by an induction coil of the Tesla type. This form of radiation is preferred because of its ready availability, low cost and sharply defined penetration.

The invention will be better understood by reference to the example, which illustrates a specific embodiment of the process.

*Example*

A film of uncoated 0.0015 inch thick cellophane (Du Pont "PT" cellophane) is irradiated in a demountable cathode ray tube with 25 kev. electrons at 10 microamps for a total exposure of 12.3 watt-sec./cm.$^2$. Three minutes after irradiation is completed, the film is immersed in monomeric vinylidene chloride. After remaining in the monomer in the dark at room temperature under nitrogen for 20 hours, the film is removed and air-dried. The side of the film which had been exposed to the electron beam is found to have become more resistant to wetting by liquid water, and to have acquired a 0.0006 inch coating of polyvinylidene chloride which is not removed by extracting for 3 days with dioxane in a Soxhlet apparatus. In contrast, the side of the film which had not been exposed to the electron beam does not exhibit improved resistance to wetting by liquid water, and has not acquired a coating of polyvinylidene chloride.

In a similar manner other organic materials may be affixed to organic polymer substrates by the process of this invention. For example, polyethylene film after irradiation with electrons or alpha-particles of suitable energy may be contacted with glycerol or polyethylene glycol to affix hydrophilic coatings to the surface of the polyethylene. Irradiated nylon fabric may be contacted with palmitic acid to affix a hydrophobic coating of the latter to the nylon. In this invention charged particles with energy in the range of 10,000 to 50,000 electron volts represent a preferred form of radiation.

An important advantage of the present invention is that coatings of non-polymerizable as well as polymerizable materials are affixed by the utilization of low-cost radiation energy with an attendant minimum radiation hazard. Another important advantage is that by limiting the energy of radiation employed, excessive crosslinking, degradation and other changes in the physical properties of the organic polymer substrate are avoided.

The process of this invention is particularly useful for permanently affixing sizes to fibrous organic polymeric materials; finishing agents, anti-static coatings, and coloring materials to fabrics; and "slip" agents, waterproofing layers, etc., to films such as cellophane.

Since many different embodiments of the invention may be made without departing from the spirit and scope thereof, it is to be understood that the invention is not limited by the specific illustrations except to the extent defined in the following claims.

What is claimed is:

1. In a process for coating an organic polymer substrate with a dissimilar organic material, the improvement of subjecting the polymer substrate in the substantial absence of oxygen to ionizing charged particle radiation having an energy of from 15 to 50,000 electron volts for a minimum exposure of 0.01 watt-seconds per square centimeter but for a maximum exposure insufficient to degrade said organic polymer and thereafter while the effect of irradiation is still active applying a coating of the dissimilar organic material to the organic polymer.

2. A process as defined in claim 1 wherein the irradiated polymer is coated with a dissimilar non-polymerizable organic compound.

3. A process as defined in claim 1 wherein the irradiated polymer is coated with a dissimilar organic polymer.

4. A process as defined in claim 1 wherein the irradiated polymer is coated with a dissimilar polymeric ether.

5. A process as defined in claim 1 wherein the time elapsing between subjecting the organic polymer substrate to ionizing radiation and applying the coating of dissimilar organic material thereto is not longer than about five minutes.

6. A process as defined in claim 1 wherein the organic polymer substrate is cellophane.

7. The process of claim 6 in which the dissimilar organic material is polyvinylidene chloride.

8. A process as defined in claim 1 wherein the ionizing charged particle radiation is a member of the group consisting of electrons and alpha particles.

9. The process which comprises irradiating a cellophane shape in the substantial absence of oxygen with electrons having an energy of 15–50,000 electron volts for a minimum exposure of 0.01 watt-second per square centimeter but for a maximum exposure insufficient to degrade the cellophane and thereafter while the effect of irradiation is still active contacting the cellophane with vinylidene chloride and thereby bonding polyvinylidene chloride to the cellophane.

References Cited in the file of this patent

UNITED STATES PATENTS

| | | |
|---|---|---|
| 2,666,025 | Nozaki | Jan. 12, 1954 |
| 2,766,220 | Kantor | Oct. 9, 1956 |

FOREIGN PATENTS

| | | |
|---|---|---|
| 1,079,401 | France | Nov. 30, 1954 |
| 1,079,401 | France | Dec. 12, 1955 |
| | (4th Addition No. 66034) | |

OTHER REFERENCES

"Modern Plastics," volume 32, No. 10, June 1955, pages 159, 252 and 254.

B.N.L. 367, pages 27, 28. "Quarterly Progress Report," July 1–Sept. 30, 1955. February 1956.

B.N.L. 375, page 26. "Quarterly Progress Report," Oct. 1–Dec. 31, 1955. April 1956.

"I and E Chem.," vol. 45, pages 11A and 13A, September 1953.

"Nature," vol. 170, pages 1075, 1076; Dec. 20, 1952.

Sun: "Modern Plastics," vol. 32, pages 141–144, 146, 148, 150, 229–233, 236–238.